J. F. McELROY.
ELECTRIC LIGHTING APPARATUS.
APPLICATION FILED MAY 3, 1905.
978,388.
Patented Dec. 13, 1910.
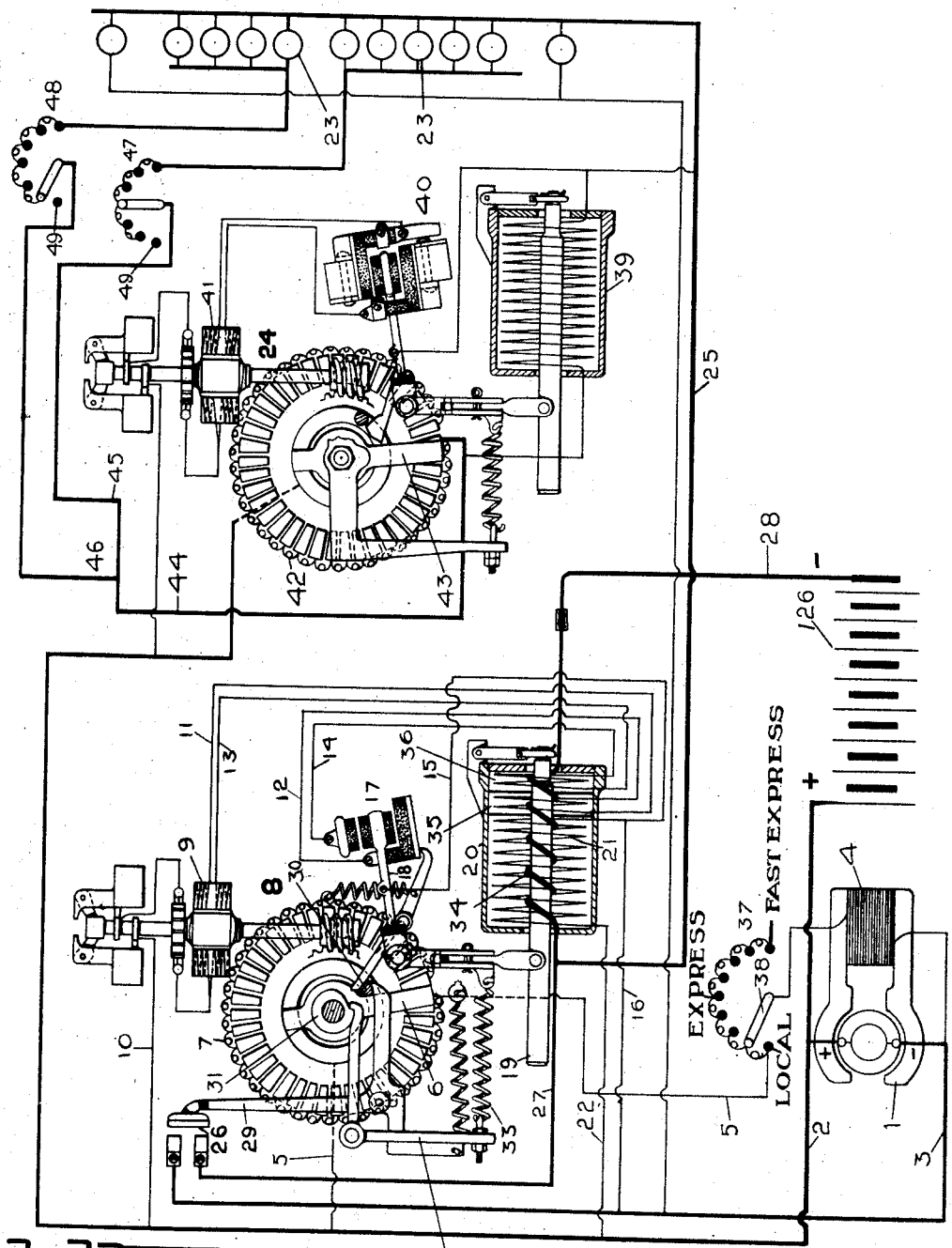
Witnesses
L. T. Shaw
M. A. Moder
Inventor
J. F. McElroy
by Bentley & Pierson
Attys.

UNITED STATES PATENT OFFICE.

JAMES F. McELROY, OF ALBANY, NEW YORK, ASSIGNOR, BY MESNE ASSIGNMENTS, TO THE UNITED STATES LIGHT & HEATING COMPANY, OF NEW YORK, N. Y., A CORPORATION OF MAINE.

ELECTRIC-LIGHTING APPARATUS.

978,388.  Specification of Letters Patent.  Patented Dec. 13, 1910.

Application filed May 3, 1905. Serial No. 258,659.

*To all whom it may concern:*

Be it known that I, JAMES F. McELROY, a citizen of the United States, residing at Albany, in the county of Albany and State of New York, have invented certain new and useful Improvements in Electric-Lighting Apparatus, of which the following specification and accompanying drawing illustrate the invention in a form which I now regard as the best out of the various forms in which it may be embodied.

This invention relates to electric lighting apparatus and especially to car-lighting systems including a generator driven by the motion of the car or train. Such a system preferably includes in addition to a generator driven from the car-axle, and the lamps in the car, a storage-battery for supplying the lamps when the dynamo is at rest or rotating below its charging speed, an automatic switch for connecting and disconnecting the generator, and one or more automatic regulating devices for maintaining the output of the generator in a desired relation to the demand of the lamps and battery throughout a wide range in speed of said generator and for regulating the voltage applied to the lamps. In various prior patents and applications I have described such a system, depending for its regulation upon the voltage of the generator and lamp mains and have shown the regulating devices as controlling both the generator voltage and the lamp voltage, sometimes by means of a single piece of regulating apparatus having resistances for both the generator field and for the lamps, primarily controlled by a single shunt regulating magnet, and sometimes by means of two separate regulators having the respective resistances and controlled by separate shunt magnets.

My present invention applies to either the single-regulator system or to the two-regulator system, and may be adapted to various kinds of car-lighting apparatus, although for the sake of giving an understanding of its operation I have shown it in connection with a system similar to that set forth in my aforesaid patents and applications.

The present improvements relate to the regulation of the generator. These improvements may be briefly described as a means for varying the point in speed at which the generator cuts in or out of operation. For connecting the dynamo to the battery and lamp circuits when it has reached a predetermined speed, and disconnecting it when it falls below that speed, I have, as in my prior practice, made use of an automatic switch controlled by the generator potential and adapted to close when the voltage of the dynamo has reached a predetermined point. But heretofore this switch has always closed at the same train-speed, say 20 miles an hour, which closing-point depended upon the strength of pull exerted by the controlling regulator-magnet upon its armature at the different voltages impressed upon said magnet by the generator, and conversely it has always opened when this or any predetermined speed has been reached in slowing down. If the regulator were out of adjustment this might sometimes result in overcharging the battery in a long daylight run, while a car given a night run with frequent stops might have its battery undercharged. To remedy such a condition when necessary and also to adapt the car-lighting system more fully to the requirements of different services, such as the local, express, and fast express services, the present invention provides for connecting and disconnecting the generator with the lamps and battery at a plurality of speeds instead of only a single speed, the apparatus being adjustable to determine in advance the speed at which the generator shall cut in. This enables the generator to cut in at a lower speed on local or relatively-slow service and at a higher speed on fast service, and adapts the same car for performing all services in the most economical manner.

It is evident that if the generator cuts in at a speed of 35 miles an hour instead of 20 miles, the car lamps will tend to run for a longer time on the battery and for a shorter time on the generator in any given run. The additional apparatus necessary to effect this result is of a very simple nature and may consist of a manually-adjusted resistance or hand-rheostat in the generator shunt-field, which also contains the automatically-variable resistance of the generator regulator. Inasmuch as the voltage of the generator depends upon the amount of current flowing through the shunt-field, and the potential magnet controlling the cut-in switch is set to operate at a fixed voltage, it follows that by manually changing the resistance of the shunt-field I am enabled to increase or decrease the voltage resulting from a given speed and hence either postpone or advance the time of closing the cut-in switch. When the dynamo finally cuts in at the standard voltage, it charges the battery at the usual rate irrespective of the adjustment of the hand-rheostat. In other words the rate of battery charging is controlled by the automatic generator regulator, and the hand resistance takes effect before the automatic regulator comes into operation.

The accompanying drawing is a diagrammatic representation of an electric car-lighting system provided with my improvements.

1 is the axle-driven generator from which lead the armature-mains 2 3. Across these is connected the shunt field 4 of the generator by a circuit 5 which traverses the revolving arm 6 and more or less of the resistances 7 of the generator field regulator 8, this shunt field being always in circuit. The regulator is operated by a small electric motor 9 through a double shunt circuit 10, 11, 12, 13, 14, 15, 16, which traverses a current director 17 whose movable lever 18 is connected with the armature 19 of a controlling solenoid-magnet 20. The principal winding 21 of this magnet is a shunt permanently in circuit by wires 22 16 across the generator mains, so that this magnet measures the generator potential, and when that potential has risen to a predetermined point, the magnet draws in its armature, and through the upper contact of the current-director 17 establishes the circuit 10, 13, 14, 15, 16 through the motor 9 which moves the rheostat brush 6 in a direction to place resistance in the field circuit of the generator. If the generator voltage drops, the magnet 20 releases its armature and the current-director 17 through its lower contact establishes the motor-circuit 10, 11, 12, 15, 16 which rotates the motor armature in an opposite direction and cuts out resistance from the generator field-circuit. Thus the voltage of the generator is regulated to stand at a constant potential, which constant potential however may be an "adjusted" constant potential. It is desirable for instance to have the generator connect with the lamps at a potential substantially the same as that which the storage battery imparts to the lamps, which may be assumed to be 60 volts, and then rise in potential to charge the battery. The storage-battery 126 is constantly in circuit with the lamps 23 as will be seen, through the wire 2, the lamp-regulator 24, and the return-wire 25. The generator however is connected and disconnected with the lamps and storage-battery by the action of an automatic switch 26 which as shown controls the connection of the negative generator-main 3 with a wire 27 leading from the lamp-return wire 25 and the battery-return wire 28. When this switch is closed, the lamps and battery are connected in multiple with the generator.

The lever 29 of switch 26 is actuated by a pin 30 revolving with the rheostat brush 6, and the first action of the regulator 8 when the potential magnet 20 has drawn in its armature and started the motor 9 in a resistance-inserting direction, is to close the switch 26 and connect up the generator with the lamps and battery. This takes place when, as stated, the generator has reached a potential equal to the potential which the storage battery is designed to impress upon the lamps, so that the storage battery will not reverse the current through the generator and the lamps may then change from storage battery to generator without flickering. To charge the battery however, a higher potential is needed, say up to 70 volts, and therefore when the regulator has started and connected the generator through the automatic switch 26, it proceeds to raise the standard of potential controlling the magnet 20, by a cam 31 acting on a lever 32 which varies the tension of the armature spring 33, thereby increasing the tension of this spring to a point where it requires 70 volts to bring the current-director 17 to neutral position. Then the generator must deliver a higher voltage before operating the solenoid, so that then the battery is charged at the same time the generator is operating the lamps. The potential impressed upon the lamp-circuit has meanwhile remained constant at 60 volts by the action of the lamp-regulator 24. After raising the standard of generator potential to 70 volts, the cam 31 no longer increases the tension of armature-spring 33 and thereafter said potential is maintained constant at 70 volts by the insertion or removal of resistance in the field circuit by the regulator 8, under control of magnet 20, subject however to a control exercised by the storage battery.

For the purpose of such control, the magnet 20 is provided with a coarse winding 34 in series with the storage-battery 26. When the battery is nearly exhausted and would tend to pass a heavy charging-current, which if too large might contribute to its injury, the series coil 34 strongly assists the shunt coil 21 of the magnet 20 and reduces the potential which it is necessary to impress upon said shunt coil in order to cause it to draw in its armature and cause resistance to be inserted in the generator field-circuit. Therefore the generator at first gives out a lower charging-potential than it later does when the counter-electromotive force of the battery has so increased as to diminish or efface the assistance which the series coil 34 affords to the shunt coil 21. Thus the battery receives a charging current at a higher voltage when it is nearly charged.

Included with the magnet 20 are certain "kick-off" coils 35 36 in the motor circuits 11, 13, one assisting and the other opposing the action of the main shunt-coil 21, whereby when the current-director 17 has made either its upper or its lower contact, there will be an immediate tendency to break that contact, thus causing the motor 9 to "inch along" toward a position restoring equilibrium of the current director 17.

The features thus far described are not herein claimed, being made the subjects of separate patents and applications as before mentioned, but have been explained to afford a clearer understanding of the novel feature of generator control now to be described. In the field-circuit 5 of the generator 1 I have interposed a hand rheostat 37 composed permissibly of a series of contacts and intervening resistances together with a manually-adjustable contact-arm or brush 38, by means of which a greater or less resistance may be imposed in series with the field-coil 4, independently of that inserted by the automatic regulator 8. The different points of this rheostat I prefer to mark with symbols designating the corresponding service or train-speed, the no-resistance end for instance being marked "Local," the middle point "Express," and the full-resistance end "Fast express." Remembering that the magnet 20 causes the switch 26 to close and cut in the dynamo at a fixed voltage, assumed at 60 volts, it will be seen that the generator-speed at which this voltage is attained depends upon the resistance in the generator shunt-field. If therefore I vary this resistance by hand independently of the automatic regulator 8, I am enabled to change the voltage corresponding to a given speed of the generator, and can hence change the train-speed at which the generator cuts in. This hand resistance takes effect before the regulator 8 has started and before it has inserted any resistance of its own in the dynamo field, and the hand resistance therefore controls the initial action of the regulator, the action of the switch operated thereby, and the action of the generator. If the point marked "Local" corresponds to a speed of twenty miles an hour and the arm 38 is adjusted to that point, the dynamo will cut in when the train has reached a speed of twenty miles an hour. The "Express" adjustment may correspond to a speed of say thirty miles an hour and the "Fast express" to a speed of thirty-five miles an hour. When the generator cuts in at twenty miles an hour the lamps will run for a relatively shorter time on the battery and a relatively longer time on the dynamo, or in other words a greater proportion of the time of train-travel will be devoted to the simultaneous charging of the battery and operation of the lamps, as is proper on a local service with frequent stops requiring frequent charging of the battery, while on a fast run with few stops the battery will not be needed so much and the dynamo need not cut in to charge it at such a low speed. This arrangement therefore enables the system to be operated under the most economical conditions for all services and also enables it to be adjusted to prevent overcharging or undercharging of the battery under particular conditions.

Sometimes the automatic switch 26 is operated directly by magnetic force, and it is to be understood that my invention extends to an automatic switch so operated as well as to the type of switch described. My invention may also be carried out with different specific instrumentalities for varying the speed at which the generator cuts in. In order to show a complete system I have also represented a preferred form of lamp circuit, including both automatic and manual voltage-regulating devices, in connection with which the aforesaid generator-controlling means may be used, although not restricted to such conjoint use.

Referring now to the lamp-circuit, it will be seen that the potential applied to the lamps is controlled by a regulator 24 essentially similar to the regulator 8 in its resistance-varying features. This regulator is controlled by a potential magnet 39 measuring the voltage across the lamp mains between the resistance and the lamps, which in turn controls a current-director 40 for operating a motor 41 in one direction or the other so as to increase or decrease the resistance 42 in series with the lamps by movement of the rheostat arm or brush 43. From the rheostat the lamp-wire 44 branches into two portions 45 46 each feeding a separate group of lamps 23, which may be for example the aisle lights and the berth lights of a sleeping car. Any number of circuit branches and groups of lamps may be employed.

In each of the branches 45 and 46 I have shown a hand-adjusted rheostat 47 48, similar to the rheostat 37 already described but each preferably having a dead or isolated contact 49 onto which the arm may be moved after placing in circuit the full resistance, so that the lamps are first dimmed and then extinguished, the device thereby being constituted as a combined rheostat and switch. These hand rheostats act to a certain extent in a manner similar to the rheostat 37 in that they are employed to vary the condition of the circuit on which an automatic voltage regulator acts. They have also however the function of varying the illuminating power of the lamps under the influence of the voltage impressed upon the lamp circuit by the generator or by the storage-battery. This voltage remains the same under control of the regulator 24, irrespective of the adjustment of the hand rheostats, but the proportion of the total lamp-current consumed in the lamps and used up in the resistances respectively is varied by changing the amount of this resistance in circuit. Furthermore, the resistances in the two branch circuits may be varied independently, so that the lamps in one branch circuit may be dimmed while those in the other are left bright, or both may be dimmed in different degrees. Whatever may be the voltage thus applied to the lamps in either circuit, the automatic regulator serves to maintain this voltage constant for any one adjustment of the hand rheostat and regulates both circuits automatically at the same time. It is apparent that the total resistance of each branch lamp circuit is divided into two parts, one of which is manually adjusted and the other automatically adjusted. If any adjustment given to the hand rheostats tends to vary the difference of potential between the lamp mains, the arm of the automatic regulator takes a new position which maintains constant the potential applied to the lamp circuits.

What I claim as new and desire to secure by Letters Patent is:

1. In a car lighting system the combination of lamps and a storage battery, a generator driven at a variable speed by the motion of the car and capable of charging the battery and operating the lamps at the same time, means controlled by the generator potential for automatically connecting the generator with the lamps and storage battery at a predetermined speed, and electrical means adjustable at the will of an operator for varying the point in speed at which such connection takes place.

2. In a car lighting system the combination with a car circuit and a generator driven at a variable speed by the motion of the car, of an automatic electrical switch controlled by the generator potential for connecting said generator with the car circuit at a predetermined speed, and manually adjustable electrical means for causing the potential at which the said switch operates to be reached at different generator speeds.

3. In a car lighting system the combination of a car circuit, a variable speed generator for supplying the said circuit, a switch controlled by the potential of the generator output for connecting said generator in circuit at a predetermined speed, and a manually adjusting rheostat for causing the potential at which said switch operates to be reached at different generator speeds.

4. In a car lighting system the combination of a car circuit, a variable speed generator for supplying the same, an automatic switch for connecting the generator in circuit, an electric motor for operating said switch, a separate potential magnet controlling the operation of said motor, and an electrical adjustment for causing the critical current pressure at which said potential magnet operates to correspond with different generator speeds.

5. In a car lighting system the combination of a car circuit, a variable speed generator for supplying the same and having a shunt field, an automatic regulator controlled by the voltage of the generator for varying resistance in the field circuit, means controlled by the potential of the generator for automatically connecting the generator in circuit, and a manually adjustable rheostat in the generator field circuit.

6. In a car lighting system the combination of a car circuit, a variable speed generator driven by the motion of the car for supplying said circuit, an automatic potential regulator controlling the voltage of the generator and controlled by said voltage, an automatic switch controlled by the generator voltage for connecting the generator in circuit, and a hand rheostat controlling the generator voltage independently of said regulator.

7. In a car lighting system the combination of a generator driven by the motion of the car, lamps and a storage battery supplied by said generator, an automatic regulator controlled by the generator voltage for regulating said voltage, an automatic switch actuated by the motion of said regulator for connecting and disconnecting the generator with the lamps and storage battery, and a manually adjustable resistance for causing a given generator potential to be reached at different speeds.

8. In a car lighting system the combination of a generator driven by the motion of the car having a shunt field, lamps and a storage battery supplied by said generator, a resistance in the generator field circuit composed of two parts, one of which is controlled automatically and the other manually, means controlled by the potential of the generator output for varying the automatic part, and an automatic switch controlled by the generator potential for connecting and disconnecting the generator with the lamps and battery.

In testimony whereof I have hereunto set my hand in the presence of two subscribing witnesses, the 26th day of April 1905.

JAMES F. McELROY.

Witnesses:
WILLIAM A. MORRILL, Jr.,
ERNEST D. JANSEN.